G. B. VON BODEN.
CONDUIT JOINT.
APPLICATION FILED APR. 27, 1912.
1,042,852.
Patented Oct. 29, 1912.
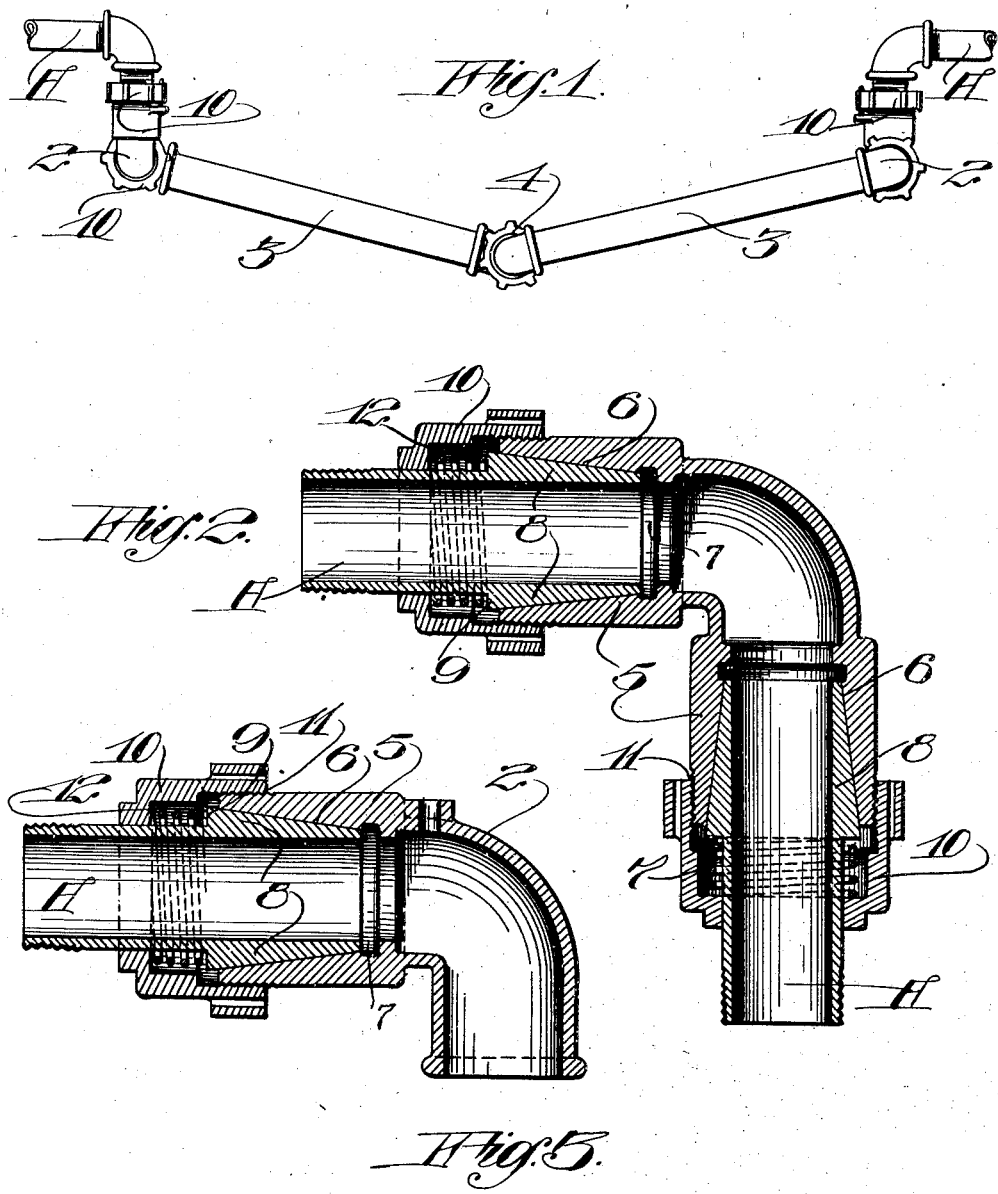

UNITED STATES PATENT OFFICE.

GEORGE B. VON BODEN, OF SAN FRANCISCO, CALIFORNIA.

CONDUIT-JOINT.

1,042,852.  Specification of Letters Patent.  Patented Oct. 29, 1912.

Application filed April 27, 1912. Serial No. 693,758.

*To all whom it may concern:*

Be it known that I, GEORGE B. VON BODEN, a citizen of the United States, residing in the city and county of San Francisco and State of California, have invented new and useful Improvements in Conduit-Joints, of which the following is a specification.

My invention relates to joints for conduits, and is especially designed for use for the conduction of oil and steam, as for locomotive work, or for air and like couplings.

It consists in the employment of coupling members and means for automatically making tight joints to prevent leakage at the coupling joints.

The invention consists of the parts and the combination and construction of parts as hereinafter more fully described and claimed, having reference to the accompanying drawings, in which—

Figure 1 illustrates the use of my couplings for conducting fuel oil between the locomotive and its tank or tender. Fig. 2 is a sectional view of a double joint. Fig. 3 is a view of a single joint.

For the purpose of conducting fuel oil or steam, or air under pressure as used upon locomotives, and under like conditions, it is desirable to have the pipes readily separable where a train or parts are to be broken up, and to provide an absolutely tight joint to prevent leakage when in use.

I have illustrated the invention in the present case as comprising a coupling between a locomotive where fuel oil is used, and the tank or tender in which the supply is contained.

A—A are the pipes connecting respectively with the tender and with the burner of the locomotive, and 2 represents the joints. These are connected in this instance by pipes 3, with a flexible joint at 4 allowing for variations in distance between the engine and tender, and for irregularities of movement. The coupling members 2 may be either direct or have the ends formed at right angles with each other, in which case the part 2 represents a quadrant of a circle, and the ends 5 have the interior connecting with the interior of the part 2, made tapering, as shown at 6. At the inner end of the tapering portion and between this and the connection with the part 2 is made an annular chamber or enlargement 7, for a purpose to be hereinafter described. The other member of this coupling may be represented by the pipe A, or some intermediate between it and the part 2. The inner end of this pipe has an enlarged tapered head 8 corresponding and fitting the interior 6 of the member 2 with a ground joint. The inner end of this tapered portion when the joint is fitted, extends only to the outer portion of the annular chamber 7 and thus allows for the conical member 8 to enter this chamber and maintain the fit between the two parts under any condition of wear or service. The tapered part 8 has a shoulder formed upon it, as shown at 9.

10 is a cap bored to fit over the pipe A, or its equivalent, and having its inner end shouldered and screw-threaded to engage corresponding screw-threads on the outside of the part 5, as shown at 11, so that this cap may serve to connect the part A with the part 2. Interior of this cap is a spiral spring 12; the outer coil of which contacts with the interior of the cap 10 and the opposite end presses against the shoulder 9 of the part 8 with sufficient strength to retain the parts in constant engagement and maintain a tight joint. As shown in Figs. 1 and 2, there are two of these joints which thus enable a change in direction in order to make the flexible coupling members 3 and 4. It will be seen that by this construction the ground tapered joint is always maintained in perfect contact; the chambers 7 allow for any wear or service which might naturally force the part 8 into the part 6, and otherwise make a leaking joint, and the spring 12 maintains the joint. Experience with an oil conductor having this joint shows that there is absolutely no leak whatever after many months of use.

Having thus described my invention what I claim and desire to secure by Letters Patent is—

1. In a conduit coupling, the combination of a pipe having an end with an external shoulder back of the extremity thereof, said pipe having the exterior tapering from the shoulder to the extremity; a coupling member of elbow-form having an enlarged end provided with a tapering bore forming a socket for the tapering pipe-end, said coupling member having an annular chamber on its inside at the base of and connecting with the socket, and disposed adjacent the inner end of the tapered pipe-end; a cap screwed upon the outer end of the coupling member, said cap being bored to fit over said pipe and to inclose said shoulder; and a spring surrounding said pipe, said cap being chambered to receive the spring, and said spring being confined between said shoulder and an end wall of the cap.

2. In a conduit coupling, the combination of pipe sections each having an end with an external shoulder back of the extremity thereof, each of said pipe sections having the exterior tapering continuously from the shoulder to the extremity; a coupling member of double elbow form having each end enlarged and provided with a tapering bore forming a socket for the corresponding end of a pipe section, said coupling member having each end provided with an annular chamber on its inside at the base of and connecting with the tapering bore, and disposed adjacent the inner end thereof, caps screwed upon the outer ends of the coupling member, said caps being bored to fit over the pipe sections and to inclose the shoulders thereof; and a spring surrounding each pipe section, said caps being chambered to receive the springs, and said springs being confined between said shoulders and an end wall of the cap.

In testimony whereof I have hereunto set my hand in the presence of two subscribing witnesses.

GEORGE B. VON BODEN.

Witnesses:
 WALTER REIMERS,
 GENEVIEVE S. DONELIN.